United States Patent [19]

Rumbaugh et al.

[11] Patent Number: 5,710,655
[45] Date of Patent: Jan. 20, 1998

[54] CAVITY THICKNESS COMPENSATED ETALON FILTER

[75] Inventors: Scott H. Rumbaugh, Lake Oswego; R. Thomas Hawkins, II, Aloha, both of Oreg.

[73] Assignee: Apeldyn Corporation, Portland, Oreg.

[21] Appl. No.: 571,283

[22] Filed: Dec. 12, 1995

Related U.S. Application Data

[63] Continuation of Ser. No. 96,041, Jul. 21, 1993, abandoned.

[51] Int. Cl.⁶ .................................................. G02F 1/03
[52] U.S. Cl. ........................ 359/249; 359/254; 359/260; 359/271
[58] Field of Search .................................. 359/249, 250, 359/254, 260, 271, 313, 87, 303

[56] References Cited

U.S. PATENT DOCUMENTS

| | | | |
|---|---|---|---|
| 3,944,330 | 3/1976 | Tsunoda et al. | 359/87 |
| 4,112,361 | 9/1978 | Nakada et al. | 359/87 |
| 4,197,008 | 4/1980 | Pinnow et al. | 356/150 |
| 4,342,502 | 8/1982 | Chang | 359/286 |
| 4,394,069 | 7/1983 | Kaye | 349/18 |
| 4,444,469 | 4/1984 | Kaye | 349/99 |
| 4,896,948 | 1/1990 | Dono et al. | 359/245 |
| 5,002,730 | 3/1991 | Cimini et al. | 420/424 |
| 5,062,684 | 11/1991 | Clayton et al. | 385/27 |
| 5,073,004 | 12/1991 | Clayton et al. | 385/27 |
| 5,103,340 | 4/1992 | Dono et al. | 359/578 |
| 5,132,826 | 7/1992 | Johnson et al. | 359/93 |
| 5,144,471 | 9/1992 | Takanashi et al. | 359/254 |
| 5,150,236 | 9/1992 | Patel | 359/71 |

FOREIGN PATENT DOCUMENTS

| | | | |
|---|---|---|---|
| 238022 | 10/1986 | Japan | 359/87 |
| 037318 | 2/1988 | Japan | 359/87 |

OTHER PUBLICATIONS

Hirabayashi, K., Ohiso, Y. and Kurokawa, T., "Polarization–Independent Tunable Wavelength–Selective Filter Using a Liquid Crystal." IEEE.

Gunning, W., Pasko, J., Tracy, "A Liquid Crystal Tunable Spectral Filter: Visible and Infrared Operation" *SPIE Imaging Spectroscopy*, vol. 268 (1981).

Patel, J.S. Saifi, M.A., Berreman, D.W., Chinlon, Lin, Andreadakis, N. and Lee, S.D. "Electrically Tunable Optical Filter for Infrared Wavelength Using Liquid Crystals in a Fabry–Perot Etalon" *Appl. Phys. Lett.*, 57 (17) Oct. 22, 1990.

Hirabayashi, K., Kurokawa, T., Hanafusa, H. and Ando, Y., "Pigtailed Compact Tunable Wavelength–Selective Filter Using a Liquid Crystal for Wavelength–Division–Multiplexing Systems." *Jpn. J. Appl. Phys.*, vol. 31 (1992).

(List continued on next page.)

*Primary Examiner*—David C. Nelms
*Assistant Examiner*—Thomas Robbins
*Attorney, Agent, or Firm*—William A. Birdwell & Associates

[57] ABSTRACT

A cavity thickness compensated etalon filter. A tuning medium is placed in a Fabry-Perot etalon cavity. The index of refraction of the tuning medium varies as a function of voltage applied across the medium. The etalon is formed of two generally flat substrates disposed substantially parallel to one another. Each substrate has a layer of conductive material within the cavity adjacent the substrate. Each substrate also has a layer of reflective material within the cavity adjacent the substrate. At least one layer of reflective material is only partially reflective so as to enable light to pass into and out of the cavity. Liquid crystal material may be used as a tuning medium in the cavity. In the case of liquid crystal material, the etalon also comprises an alignment layer disposed within the cavity adjacent each substrate to pre-order the liquid crystal material. Means are provided for selectively varying the profile of the voltage across the tuning medium so as to compensate for variation in flatness and separation of the etalon substrates. Means are also provided to the render the filter polarization insensitive.

17 Claims, 6 Drawing Sheets

OTHER PUBLICATIONS

Hirabayashi, K., Tsuda, H. and Kurokawa, T., "Narrow–Band Tunable Wavelength–Selective Filters of Fabry–Perot Interferometers with a liquid Crystal Intracavity." *IEEE Photonics Technology Letters*, vol. 3, No. 3, Mar. 3, 1991.

Hirabayashi, K., Ohiso, Y. and Kurokawa, T. "Polarization–Independent Tunable Wavelength–Selective Filter Using a Liquid Crystal." *IEEE Transactions Photonics Technology Letters*, vol. 3, No. 12, Dec. 1991.

Craig, D.W. and Staromlynska, J. "Comparison of Variable Birefringence Devices and Fabry–Perot Etalons for Use as Tunable Filters." *IEEE Journal of Quantum Electronics*, vo. 26, No. 8, Aug. 1990.

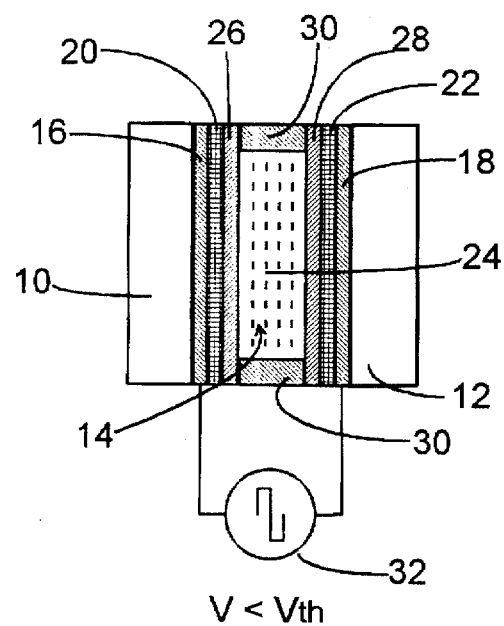
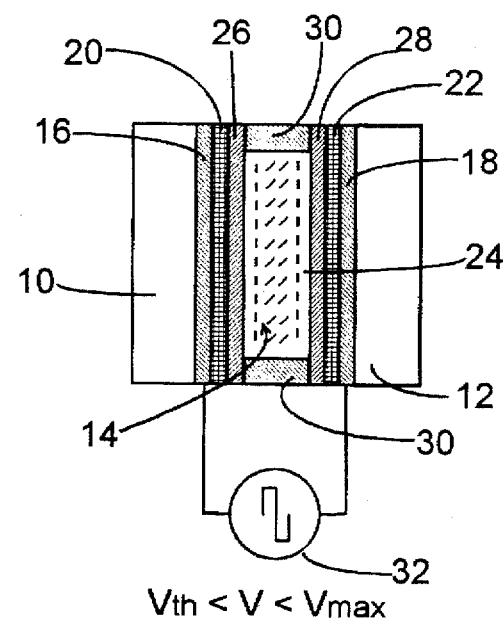
Fig. 1a            Fig. 1b
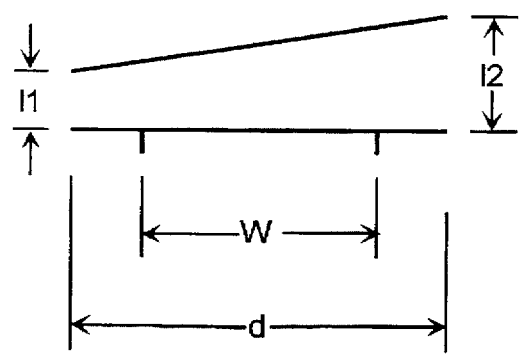
Fig. 2

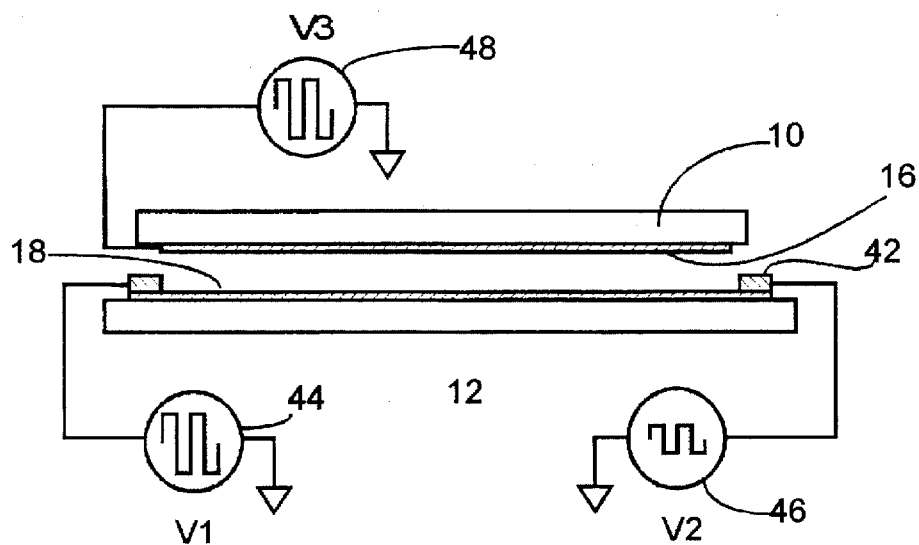
Fig. 6
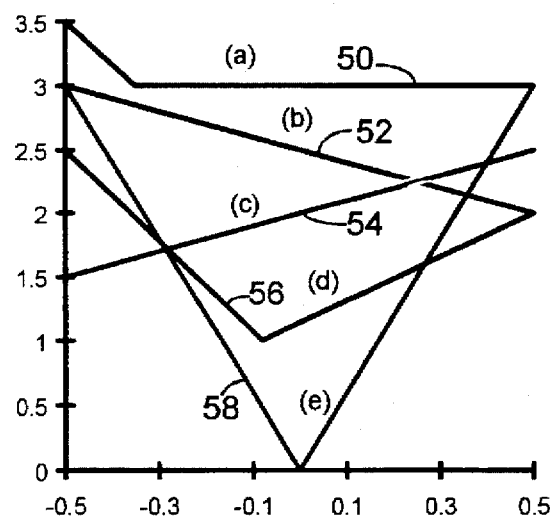
Fig. 7a
| | | $\|\phi_U - \phi_L\|$ | $V_1$ | $V_2$ | $V_3$ |
|---|---|---|---|---|---|
| 250 | (a) | $0.5\pi$ | 3.5 | 0 | 3 |
| 252 | (b) | $0.75\pi$ | 2.5 | 1.5 | 1 |
| 254 | (c) | $\pi$ | 1.5 | 2.5 | 0 |
| 256 | (d) | $0.25\pi$ | 3.5 | 0 | 2 |
| 258 | (e) | 0 | 2 | 8 | 5 |
Fig. 7b

CAVITY THICKNESS COMPENSATED ETALON FILTER

The is a continuation of application Ser. No. 08/096,041 filed on Jul. 21, 1993 abandoned.

BACKGROUND OF THE INVENTION

This invention relates to etalon optical filters, particularly to tunable etalon optical filters which employ a tuning medium whose index of refraction varies as a function of the voltage across the medium and in which variations in the parallelism and flatness of the etalon substrates are compensated for by varying the profile of the voltage across the medium.

Tunable optical filters are required in a wide variety of applications, including remote sensing and fiber-optic communication systems. One way to make a tunable optical filter is to place liquid crystal material in a Fabry-Perot etalon and control the index of refraction of the liquid crystal material by applying a selected voltage across it. Such a filter is constructed of a liquid crystal cell having two transparent, flat substrates (typically optical flats) separated by edge spacers, thereby forming a cavity, and being filled with liquid crystal material. Liquid crystal material is a fluid-like material comprised of long molecules which have an orientation order determined by their physical surroundings and the presence of an electric field, if any. In a nematic phase, liquid crystal molecules tend to align parallel to each other so that the material behaves as a uniaxial crystal. The inside surfaces of the substrates are treated with a thin-film layer of indium tin oxide ("ITO") conductor, a dielectric reflective layer, and an alignment layer. The mirrors typically have high reflectivity and low loss as required for high finesse (defined as the pass band bandwidth divided by the free spectral range). The ITO is used to apply an electric field in the direction of an optical beam passing through the etalon cavity formed by the two substrates. The alignment layer provides a predetermined order to the liquid crystal molecules.

To vary the filter wavelength, a voltage is applied across the cell to vary the orientation of the liquid crystal molecules, and thereby vary the index of refraction of the liquid crystal material in the direction of the electric field. As long as the voltage applied to the cell is less than a threshold voltage ("$V_{TH}$"), the alignment is determined solely by the surface alignment layer. However, as the voltage is increased, the molecules begin to rotate to align with the electric field. For most nematic liquid crystals This decreases the index of refraction for light polarized in the direction of the molecular axis and thereby adjusts the resonant frequency in the Fabry-Perot etalon cavity. To prevent ion migration in the cell, an AC signal, usually a square wave, is applied to the cell.

However, liquid crystal etalon filters have thus far had inadequate transmission, finesse and usable aperture for many of the aforementioned applications. The primary cause of these difficulties is non-parallel cavity mirrors. As is well understood, in order to construct an etalon with high finesse, several conditions must be met. First, the mirrors must have high reflectivity, on the order of 98–99.5%. This is relatively straight-forward to provide using high quality dielectric thin films. Second, the cavity must exhibit minimal optical absorption and scattering. Nematic liquid crystals, especially in thin cells (3–20 μm), exhibit extremely low loss and scattering from visible to infrared wavelengths. Third, the reflective surfaces must be extremely flat. Optical flats with $\lambda/20$ flatness ($\lambda$=wavelength) are readily available and sufficient for these purposes. Fourth, the reflective surfaces must be very nearly parallel. Since the optical surfaces have flatness on the order of $\lambda/20$, the reflective surfaces must be parallel to a like specification. Thence, at a wavelength of one micrometer, the total surface flatness and parallelism must typically be maintained to within 0.05 μm over the entire aperture area.

The required specification for parallelism is difficult to achieve using standard liquid crystal cell assembly techniques, especially if a large aperture is required. The spacing between the optical flats is determined by glass spacers which are dispersed in epoxy which is deposited at the edges of the cell. A problem is that the spacers can shatter and produce sub-micron slivers which can lodge between one of the optical flats and the other spacers, which can often result in creating an angle between the flats which exceeds maximum tolerance. The effects of non-parallel mirror surfaces are low transmission, a reduction in the finesse and non-uniform transmission across the aperture. These problems arise because the phase fronts of the internally reflected beams do not maintain the proper phase relationship for very many reflections.

In a standard liquid crystal etalon, there is no way to correct for misaligned mirrors after the cell is assembled. The only way to minimize the problem during assembly is to separate the spacers a relatively great distance beyond the aperture to minimize the spacing variation across the aperture. However, bowing of the glass substrates can also occur, so it is usually not practical to build an etalon which is significantly larger than the aperture. Moreover, while high quality optical flats are available, the degree of their flatness nevertheless affects the characteristics of the filter.

Accordingly, there is a need for an improved tunable etalon filter in which variations in flatness and spacing between the substrates in the fiber are compensated for so as to increase the effective relative flatness and spacing thereof.

SUMMARY OF INVENTION

The present invention meets the aforementioned needs and solves the aforementioned problems by providing an etalon filter employing a tuning medium on the cavity whose index of refraction varies as a function of voltage across the medium and wherein the profile of the voltage across the medium may be selectively varied so as to compensate for variations in flatness and separation of the etalon substrates. The etalon is formed of two generally flat substrates disposed substantially parallel to one another. Each substrate has a layer of transparent conductive material within the cavity adjacent the substrate. Each substrate also has a layer of reflective material within the cavity adjacent the substrate. At least one layer of reflective material is only partially reflective so as to enable light to pass into and out of the cavity. While the invention is not limited to the use of liquid crystal material as a tuning medium in the cavity, in the case of liquid crystal material, the etalon also comprises an alignment layer disposed within the cavity adjacent each substrate to pre-order the liquid crystal material.

The voltage profile is produced by applying a first voltage to one edge of the layer of conductive material on one substrate and a second, different voltage to another edge of that layer of conductive material, the edges being substantially parallel and separated from one another. Due to the resistance of the layer of conductive material, a voltage gradient across the material from edge to edge results. To obtain two dimensional control over the voltage profile, a third voltage is applied to one edge of the other layer of conductive material and a fourth, different voltage is applied to the other edge of the other layer of conductive material. The edges of the second layer of conductive material are separated from one another and are non-parallel to the aforementioned edges of the first layer of conductive material. By appropriately selecting the first, second, third and fourth voltages, a two-dimensional, linear voltage profile may be selectively applied across the tuning medium.

The voltages applied to the cell are alternating current voltages. By varying the amplitude and phase of the voltages applied to one conductive electrode relative to the other conductive electrode an arbitrary V-shaped profile may be selectively placed across the tuning medium. By time multiplexing different voltages over a predetermined period of time less than the response time of the conductive medium, an arbitrary voltage profile may be applied across the conductive medium.

To apply the voltage uniformly across the layer of transparent conductive material, each edge of the conductive material has disposed therealong a contact which has much lower resistivity than the material of which the conductive layer is comprised. The filter is made polarization insensitive by two alternative approaches. In one approach a light beam is split into two distinct light beams having orthogonal polarizations. Those two distinct beams are directed into two parts of the cell having distinct sets of conductive electrodes and are recombined after they have passed through the etalon cavity. Another approach is to use a polarization controller in advance of the filter to maintain the polarization in a predetermined state.

Therefore, it is a principal object of the present invention to provide a novel and improved cavity thickness compensated etalon filter and filtering method.

It is another object of the present invention to provide a tunable optical filter with improved transmission, finesse and aperture characteristics.

It is a further object of the present invention to provide a novel and improved liquid crystal tunable etalon filter.

It is yet another object of the present invention to provide an etalon filter which compensates electrically for variations in flatness and spacing.

It is yet a further object of the present invention to provide a tunable optical filter which is polarization insensitive.

The foregoing and other objects, features and advantages of the invention will be more readily understood upon consideration of the following detailed description of the invention, taken in conjunction with the accompanying drawings.

BRIEF DESCRIPTION OF THE DRAWINGS

FIG. 1a is an edge view of a nematic liquid crystal etalon wherein the voltage V applied to the etalon is less than the threshold voltage Vth.

FIG. 1b is an edge view of a nematic liquid crystal etalon wherein the voltage V applied to the etalon is greater than the threshold voltage Vth but less than the maximum voltage that can be applied, Vmax.

FIG. 2 is an illustration of the pertinent dimensions of an etalon with anti-parallel mirrors.

FIG. 3b is a graph of the voltage gradient as a function of position for the electrode design of FIG. 3a.

FIG. 6 is a diagram one example of the application of bias signals to the liquid crystal etalon according to the present invention.

FIG. 7a is a graph of alternative voltage profiles produced across the tuning medium of a flatness compensated etalon according to the present invention.

FIG. 7b is a table of voltage values applied to the contacts shown in FIG. 6 to produce the voltage profile shown in FIG. 7a.

DETAILED DESCRIPTION OF THE INVENTION

Figure 3A:
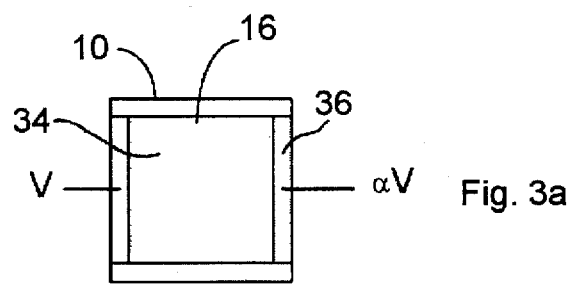
FIG. 3a is an illustration of the electrode design for a liquid crystal etalon having voltage gradient compensation.

Referring to FIGS. 1a and 1b, a basic liquid crystal tunable etalon comprises a first substrate 10, typically a glass plate sometimes known as an "optical flat", and a second substrate 12, both substrates being generally flat. and disposed substantially parallel to one another. Typically, both substrates 10 and 12 are made of a material that is transparent at the range of wavelengths to which the etalon is applicable, that material ordinarily being glass, though the etalon may be a reflective rather than a transmissive type etalon wherein one substrate is not necessarily transparent. The two substrates form a cavity 14 therebetween. A first electrode 16, formed of a layer of transparent conductive material is disposed in the cavity 14 adjacent the first substrate 10. A second electrode 18, formed of a layer of transparent conductive material, is disposed within the cavity adjacent the substrate 12. In the case of a reflective etalon, only one of the electrodes needs to be transparent. In the case of a liquid crystal tunable etalon, the electrodes are typically made of indium tin oxide ("ITO"). A mirror 20, typically made of a dielectric material that is reflective at the wavelength to which the etalon applies, is disposed within the cavity adjacent the electrode 16. Another similar mirror 22 is disposed in a cavity adjacent the electrode 18. Although this is the preferred embodiment, it is also possible to place the mirrors 20 and 22 outside the cavity containing the tuning medium 24 and electrodes 16 and 18. While both of the mirrors 20 and 22 are highly reflective, one or both of them is only partially reflective so that light can pass into and out of the etalon.

A tuning medium 24 is placed between the substrate 10 and the substrate 12. In the case of a liquid crystal tunable etalon, the tuning medium 24 comprises liquid crystal material, typically nematic liquid crystal material. Where liquid crystal material is used, an alignment layer 26 is disposed in the cavity adjacent mirror 20 and an alignment layer 28 is disposed in the cavity adjacent mirror 22. These alignment layers cause the liquid crystal molecules to be uniformly aligned, as is commonly known in the art. Spacers 30, typically made of epoxy and glass beads are disposed at the edges of the cells to space the substrates apart from one another, typically about 10 μm.

Voltage is applied to the first electrode 16 and the second electrode 18 by a voltage source 32. In order to avoid ion migration, the voltage source ordinarily is an alternating current voltage source, typically a square wave. As shown in FIG. 1a, when the applied voltage V is less than a threshold voltage Vth, the liquid crystal molecules remain uniformly ordered. However, when the applied voltage V is greater than the threshold voltage Vth, though less than the maximum applicable voltage, V max, the liquid crystal molecules rotate, as shown in FIG. 1b. The rotation of the liquid crystal molecules changes the index of refraction of the liquid crystal material, thereby tuning the filter as is understood by persons skilled in the art. While this prior art tunable etalon employs liquid crystal material as the tuning medium, it is to be recognized that other material whose index of refraction is a function of the voltage applied thereto might also be employed in such an etalon.

Turning to FIG. 2, the substrates of an etalon filter are not perfectly flat or perfectly parallel to one another. This means that the spacing between the two substrates is not perfectly uniform. Indeed, as flat as the substrates are in the absolute sense, they may bow significantly relative to the wavelength of light to be filtered. Moreover, variations in the thickness of the electrode, mirror and alignment layers may also affect the spacing significantly. In addition, density variations in the tuning medium may also affect the effective optical spacing. FIG. 2 shows a simplified diagram of pertinent dimensions of the filter cavity. That is, the spacing at one edge is shown as "L1" and the spacing at the opposite edge is shown as "L2". The distance between edges is shown as "d" and the width of the aperture required is shown as "w". These dimensions will be used herein to describe the present invention.

Turning to FIG. 3a, the surface of a first substrate 10 has an electrode 16. Disposed on the electrode 16 opposite edges thereof are respective layers of conductive material such as gold or aluminum, thereby forming contacts 34 and 36. A voltage V is applied to the contact 34 and a voltage αV is applied to the contact 36, where α represents a slope factor because the contacts have low resistance relative to the resistive electrode 16, the potentials V and αV are distributed substantially evenly across the contacts 34 and 36 respectively. In the case of liquid crystal material, V and αV will be AC voltages, and will typically be square waves. The second substrate 12 also has a resistive electrode and two layers of conductive material disposed at opposite edges thereof to form contacts, as will be explained more fully hereafter.

Figure 3B:
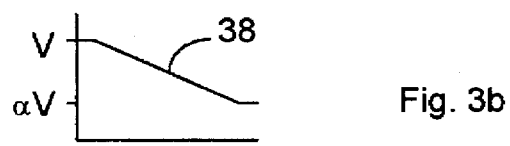
Figure 3C:
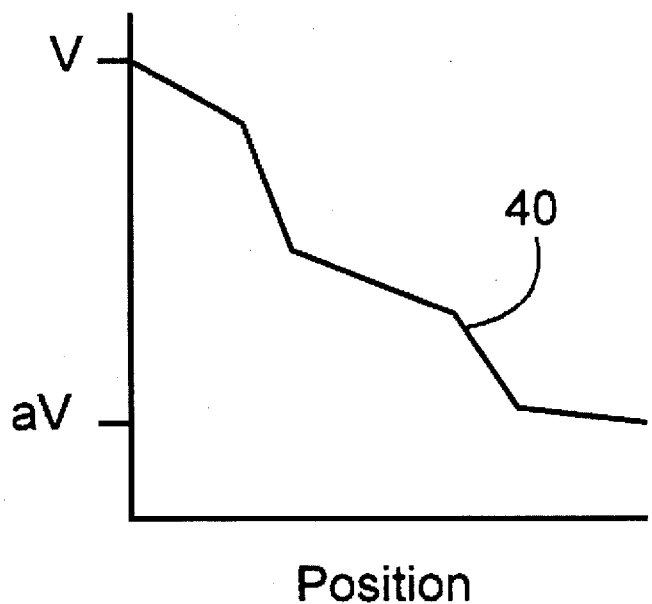
FIG. 3c is a graph of the voltage gradient as a function of position for the electrode design of FIG. 3a for the case of non-uniform electrode resistivity.

Turning to FIGS. 3b and 3c, a voltage drop occurs across the resistive electrode 16 so that the voltage decreases from the higher voltage V to the lower voltage αV, resulting in a voltage gradient as illustrated by the graph line 38. If the resistance per unit area, i.e., the resistivity, is equal for all areas of the electrode, the voltage will decrease linearly as a function of position from the higher voltage αV to the lower voltage V. The slope and position of the voltage drop 38 can be set arbitrarily by changing V and αV. If the resistance per unit area is not constant across the resistive electrode 16, the voltage will drop in a non-linear way, as is illustrated by the graph line 40.

The voltage gradient can be used to compensate for non-parallel substrates. The effect of non-parallel substrates is to cause unequal phase delay across the etalon. The voltage gradient induces an index of refraction gradient ("index gradient") which compensates for the uneven spacing of the non-parallel substrates and thereby eliminates the unequal phase delay across the etalon. In the case of liquid crystal, the change in index is not a linear function of applied voltage, so a non-linear index gradient is created by a linear voltage gradient. However, for small corrections, as are typically needed, the change in index is substantially linear. Also, in the case of liquid crystal material, the index gradient is induced for light in one polarization only.

Figure 4A:
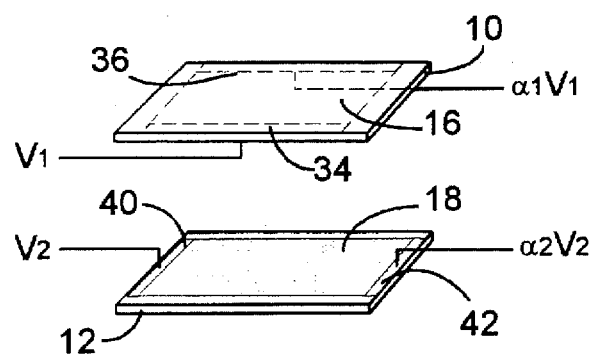
FIG. 4a is an illustration of the electrode configuration of a two-dimensional voltage compensated liquid crystal etalon according to the principles of the present invention.
Figure 4B:
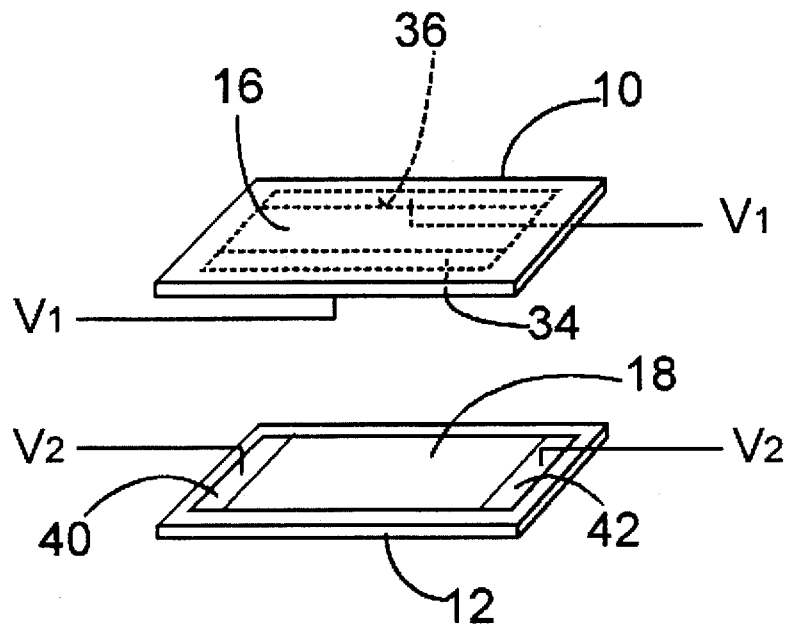
FIG. 4b is an illustration of the electrode configuration of a more general two-dimensional voltage compensated liquid crystal etalon according to the principles of the present invention.

Turning now to FIGS. 4a and 4b, in order to compensate for non-parallel substrates in any direction, the second substrate 12 is provided with a electrode 18 and contacts 40 and 42, the contacts 40 and 42 being disposed orthogonal to the contacts 34 and 36 of the first substrate 10. The resistive electrodes 16 and 18 and the contacts 34, 36, 40 and 42 are typically disposed on the inside surfaces of the first substrate 10 and the second substrate 12; however, the electrodes, the contacts, or both could be placed on the outside surfaces of their respective substrates 10 and 12. Because the voltage gradients imposed across the first electrode 16 and the second electrode 18 are orthogonal to each other, the net voltage gradient can be arbitrarily directed and the effect of non-parallel substrates can be compensated for in any direction.

Figure 5:
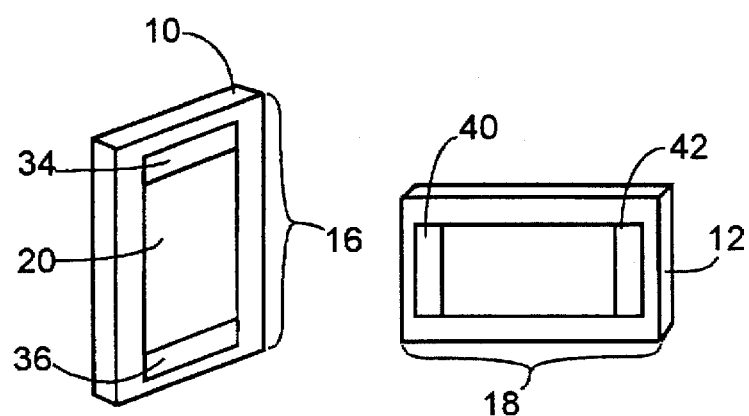
FIG. 5 is a schematic diagram of etalon components according to the present invention.

FIG. 5 is a schematic diagram of the etalon components according to the present invention. The first mirror 20 is typically disposed on the electrode 16; however, it could be disposed between the substrate 10 and the electrode 16, or it could be disposed on another surface which is in line with the optical path entering the etalon. A second mirror 22 is disposed on the second substrate 12 following the same guidelines as for the first mirror. In the case of liquid crystal material, an alignment layer would be disposed on the surface adjacent to the cavity. If an AC signal is applied to the contacts 34, 36, 40 and 42, as would typically be done if liquid crystal material were used, the contacts 34, 36, 40 and 42 do not need to be in physical contact with the electrodes; they may simply be capacitively coupled, as would be the case if an insulating layer were disposed between the contacts 34, 36, 40 an 42 and the electrodes 16 and 18.

It is possible to correct for more complicated non-parallelism than simple tilt, for instance bowing, by adjusting the phase and frequency of the voltages which are applied to the contacts. Turning to FIG. 4b, consider square wave bias voltages applied to the contacts 34, 36, 40 and 42. These applied voltages V1, V2, V3 and V4 respectively may be of the form $$V1 = A_1 \cdot S(\omega_1 t + \phi_1)$$

$$V2 = A_2 \cdot S(\omega_2 t + \phi_2)$$

$$V3 = A_3 \cdot S(\omega_3 t + \phi_3)$$

$$V4 = A_4 \cdot S(\omega_4 t + \phi_4)$$

where S is a unit amplitude square wave with angular frequency wn and phase $\phi$n, and An is a voltage amplitude. By choosing $A_1$, $A_2$, $A_3$, $A_4$, $\phi_1$, $\phi_2$, $\phi_3$ and $\phi_4$ a variety of voltage profiles may be produced. These profiles will be a linear gradient or a V-shaped voltage gradients ("V-gradients"). By choosing the relationship between $\omega_1$, $\omega_2$, $\omega_3$ and $\omega_4$, the voltage gradient will have a time dependant characteristic. If the time period between changes is slow with respect to the response time of the tuning medium, time dependant tuning effects can be realized. For instance, a voltage gradient profile similar to 40 in FIG. 4c can be used to produce a switchable grating.

A specific example of implementation of a V-gradient for correction of a deformed and tilted etalon cavity is shown in FIG. 6. Consider a first voltage source 44, a second voltage source 46 and a third voltage source 48 with voltages V1, V2, V3 and V4 respectively which are of the form $$V1 = A_1 \cdot S(\omega t + \phi_1)$$

$$V2 = A_2 S(\omega t + \phi_1)$$

$$V3 = A_3 \cdot S(\omega t + \phi_u)$$

$$V4 = V3$$

The upper electrode 16 has a constant bias voltage V3 applied. The lower electrode 18 has a voltage gradient from V1 to V2 due to the voltages applied to the first contact 40 and the second contact 42. The liquid crystal molecule directors align along the mean absolute bias field, which can be shown to be $$V_{bias}(x) = (|\phi_u - \phi_1|/\pi)\{(A_1+A_2)/2 - (x/W)(A_1-A_2) + A_3\} + (1 - |\phi_u - \phi_1|/\pi)|(A_1+A_2)/2 - (x/W)(A_1-A_2) - A_3|$$

Where the width of first electrode 10 is designated as W, the position on this electrode is represented by a variable x increasing from the first contact 34 to the second contact. 36, and with $-W/2 \leq x \leq W/2$. By adjusting the phase difference $\phi_u - \phi_1$ and the magnitudes $A_1$, $A_2$ and $A_3$, the voltage profile of this bias can be varied over a considerable range.

A few examples of the possible voltage profiles in the x dimension are shown in FIG. 7a and FIG. 7b. Voltage profiles 50, 52, 54, 56 and 58 are obtained by setting the voltage and phases of the applied signals as indicated by rows 250, 252, 254, 256 and 258 in FIG. 7b.

Figure 8:
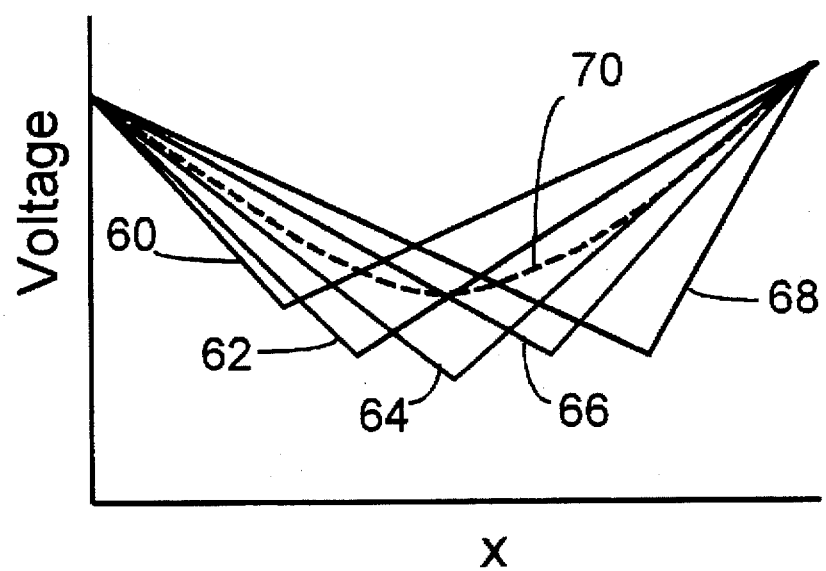
FIG. 8 is a graph of exemplary time division multiplex voltage profiles applied to a flatness compensated etalon according to the present invention in order to create an arbitrary voltage profile.

Turning to FIG. 8, a more complex correction for bowing or other lack of flatness of the first substrate 10 or the second substrate 12, or both, involves producing a sequence of V-shape gradients. If the V-shaped gradient voltage profiles 60, 62, 64, 66 and 68 are produced at separate times, in any order, an average voltage profile 70 is produced, provided that the switching time between the V-shaped gradient voltage profiles 60, 62, 64, 66 and 68 is shorter than the response time of the tuning medium. In the case of liquid crystals, the sequence of voltage gradient profiles 60, 62, 64, 66 and 68 must ordinarily be completed in less than a few milliseconds.

Figure 9:
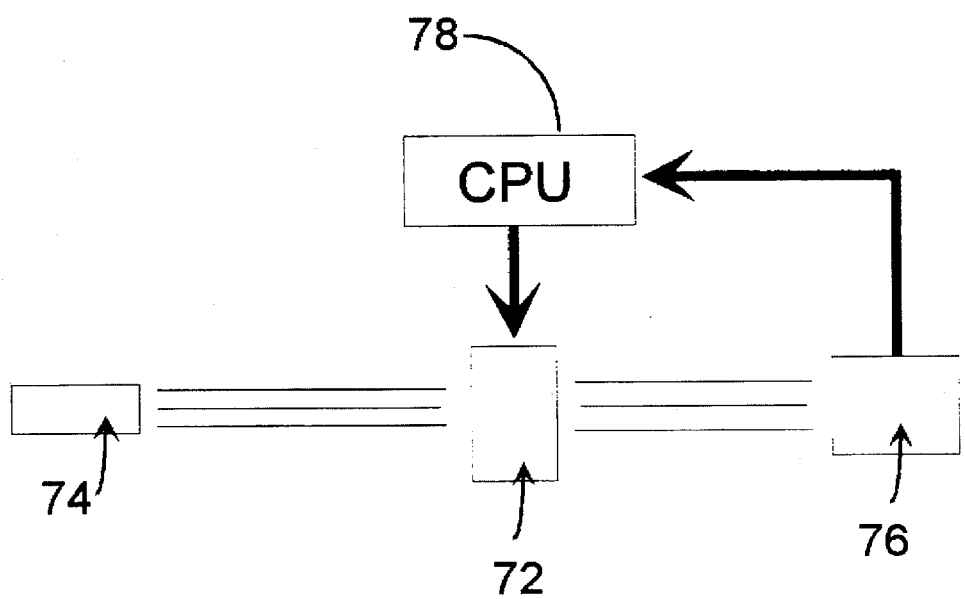
FIG. 9 is a block diagram of a tunable cavity thickness compensated etalon system of the present invention, including a micro-processor controlled feedback control system for optimizing the filter characteristics.

Turning to FIG. 9, the drive electronics can be calibrated automatically to accommodate for arbitrary tilt and bowing of the first substrate 10 and the second substrate 12. An optical source 74 emits an optical signal 75 which passes through the etalon filter 72 and is measured with a light measurement system 76 which is capable of measuring filter characteristics such as, but not limited to, finesse, bandwidth and transmission. A processor 78, such as a microprocessor digital computer, adjusts the drive levels and phases applied to the etalon filter 72 and monitors the etalon filter 72 performance as measured by the light measurement system 76 until the etalon filter 72 performance is optimized.

For many applications, the filter needs to operate independent of the input optical signal polarization. However, in the case of liquid crystals, the filter operates for one polarization only. The invention provides three alternative methods for making the etalon filter polarization independent. Two of the approaches use polarizing beamsplitters to split the polarization into two polarization components which are handled independently by the etalon filter. The two polarization components are then recombined. In a third approach, a polarization sensor and controller monitors the input polarization and changes to the proper polarization for the etalon filter.

Figure 10A:
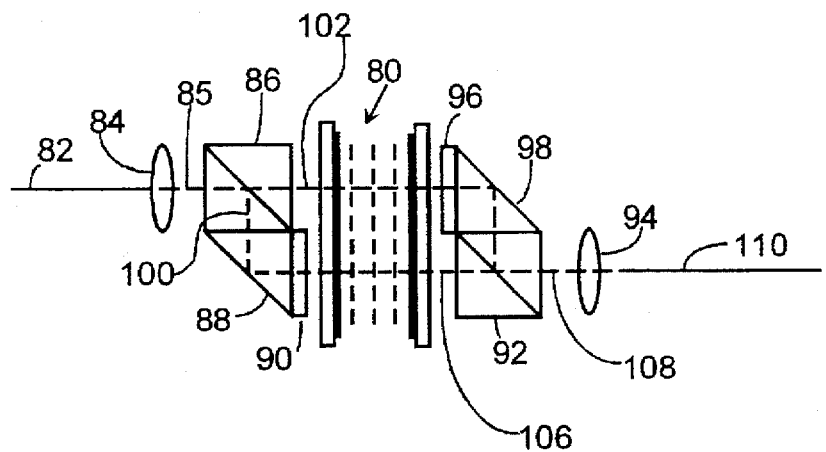
FIG. 10a is a schematic diagram of a polarization independent liquid crystal, cavity thickness compensated tunable etalon using polarizing beam spitters and half wave plates according to the present invention.

Turning to FIG. 10a, an input optical signal 85 propagates through an optical fiber 82, is collimated by a lens 84 and is split into two orthogonal polarizations by a polarizing beamsplitter 86. A first polarization component 102 passes through the filter. The filter is aligned so that the first polarization component 102 has the proper alignment to be filtered. The second polarization component 100 is deflected by the polarizing beamsplitter 86 to a prism 88 which, in turn, deflects it through a first half-wave plate 90. The first half-wave plate is aligned so that the polarization of the second polarization component 100 is rotated by 90 degrees to cause it to pass through the etalon filter 80 with the proper polarization.

After passing though the filter, the first polarization component 102 passes through a second half-wave plate which is aligned so as to rotate the polarization by 90 degrees. The first polarization component 102 is then deflected by a second prism 98 to a second polarizing beamsplitter 92. Because the polarization of the first polarization component 102 was rotated by 90 degrees by the second half-wave plate 96, the first polarization component 102 is deflected by the second polarizing beamsplitter 92 into a second collimating lens 94.

After passing through the etalon filter, the second polarization component 100 passes directly through the second polarizing beamsplitter 92 into the second collimating lens 94. The first polarization component 102 and the second polarization component 100 combine to form the output optical signal 108 which is focused by the second collimating lens 94 into a second optical fiber 110. The voltage gradient technique compensates for any path length difference resulting from non-parallel substrates as well as improving the finesse, bandwidth and transmission of the filter.

Figure 10B:
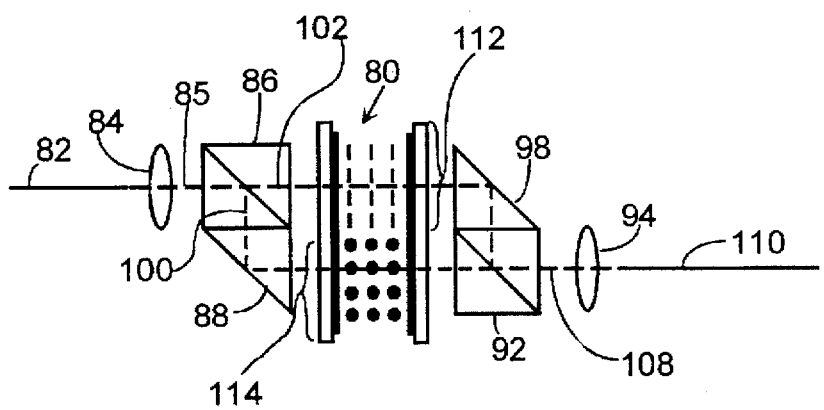
FIG. 10b is a schematic diagram of an alternative polarization independent liquid crystal, cavity thickness compensated tunable etalon using polarizing beam splitters according to the present invention.

A second method for making a polarization insensitive etalon filter is illustrated in FIG. 10b. The input optical signal 85, propagates through an optical fiber 82, is collimated by a lens 84 and is split into two orthogonal polarizations by a polarizing beamsplitter 86. A first polarization component 102 passes through a first etalon filter region 112 which has a molecular alignment to tune light having the polarization of the first polarization component 102. A second polarization component 100 is deflected by the first polarizing beamsplitter 86 to a first prism 88, which deflects through a second etalon filter region 114 which has a molecular alignment to tune light having the polarization of the second polarization component 100. After passing through the etalon filter 80 the first polarization component 102 and the second polarization component are recombined by the second polarizing beamsplitter 94 and focused into a second optical fiber 110. Alternatively, the first etalon filter region 112 and the second filter region 114 may be separate liquid crystal etalon filters with each etalon filter aligned to tune light having the polarization of each respective polarization component.

Figure 11:
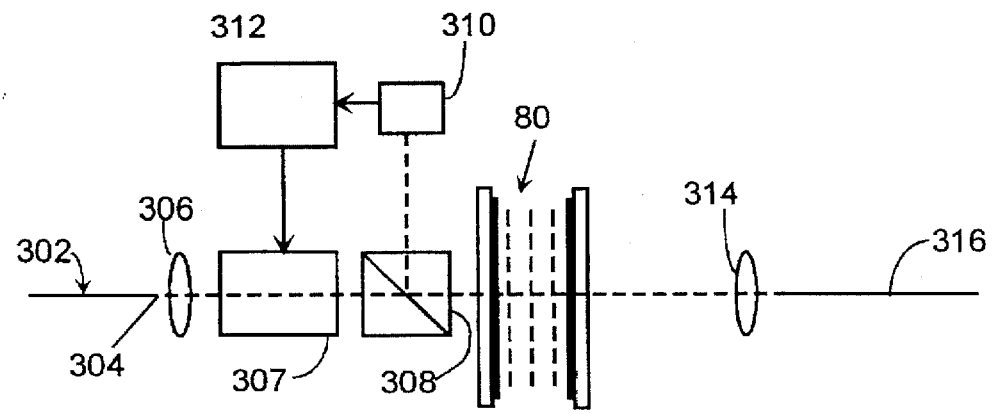
FIG. 11 is a schematic diagram of a polarization independent, cavity thickness compensated liquid crystal tunable etalon employing a polarization controller according to the present invention.

FIG. 11 is a schematic diagram of an alternative polarization-insensitive fiber-pigtailed liquid crystal etalon for polarized optical input according to the current invention. The optical signal from fiber 302 is collimated by lens 304. The collimated signal passes through polarization controller 307 and polarization selective reflector 308 which are placed in front of and in series with the etalon 80. The optical signal transmitted by the etalon is focussed by lens 314 into the output fiber 316. The polarization selective reflector 308 is chosen to reflect only the polarization component of the input optical signal orthogonal to the polarization component tunably filtered by the etalon 80. The reflected optical signal is detected by photodetector 310 which delivers an electrical signal proportional to the reflected optical power to a control circuit 312. The control circuit iteritively adjusts the state of the polarization controller 307 to minimize this electrical signal. Thus the reflected optical power in the undesired polarization is minimized and the tunable optical signal is maximized. For polarized light delivered by input fiber 302, the reflected power from the polarization selective reflector is approximately zero. The optical signal filtered by the etalon 80 is thus optimally polarized.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. An etalon filter, comprising:
   a first, generally flat substrate;
   a second, generally flat substrate substantially parallel to said first substrate so as to form a cavity therebetween, said second substrate being substantially transparent to light at a predetermined wavelength;
   a first layer of conductive material disposed in said cavity adjacent said first substrate;
   a second layer of conductive material disposed in said cavity adjacent said second substrate, said second layer of conductive material being substantially transparent to light at said predetermined wavelength;
   a first layer of reflective material disposed in said cavity adjacent said first substrate;
   a second layer of reflective material disposed in said cavity adjacent said second substrate, said second layer of reflective material being partially reflective at said predetermined wavelength;
   a tuning medium disposed in said cavity, said tuning medium being substantially transparent to light at said predetermined wavelength, the index of refraction of said tuning medium being a function of the voltage applied across said tuning medium; and
   compensation means for enabling a non-uniform voltage profile to be applied across said tuning medium between said first layer of conductive material and said second layer of conductive material.

2. The filter of claim 1, wherein said second layer of conductive material has a first edge and a second edge substantially parallel to and separated from said first edge, said first conductive layer including a first contact disposed along said first edge and a second contact disposed along said second edge, each said contact being made of material having a much higher conductivity than the conductivity of the rest of said second conductive layer.

3. The filter of claim 2, wherein said second substrate is made of glass, said second layer of conductive material is made of indium tin oxide, and said first and second contacts are made of a metal.

4. The filter of claim 3, wherein said tuning medium comprises liquid crystal material.

5. The filter of claim 2, further comprising source means for applying a first voltage to said first contact and a second voltage to said second contact.

6. The filter of claim 1, wherein said tuning medium comprises liquid crystal material.

7. The filter of claim 1, wherein said second layer of conductive material has a first edge and a second edge substantially parallel to and separated from said first edge, said filter further comprising source means for applying a first voltage to said first edge and a second voltage to said second edge.

8. The filter of claim 7, wherein said first and second voltages are alternating current voltages, and said source means includes means for applying a third alternating current voltage to said first layer of conductive material and phase control means for varying the phases of said first and second voltages relative to said third voltage to vary said voltage profile.

9. The filter of claim 8, wherein said phase control means includes means for providing different relative phases of alternating current voltage to said first and second layers of conductive material at different times to vary the average of said voltage profile over a predetermined period of time.

10. The filter of claim 9, wherein said tuning medium has a response time less than said predetermined period of time.

11. The filter of claim 9, wherein said tuning medium comprises liquid crystal material.

12. The filter of claim 8, wherein said tuning medium comprises liquid crystal material.

13. The filter of claim 7, wherein said first layer of conductive material has a first edge and a second edge substantially parallel to and separated from said first edge of said first layer of conductive material, said first and second edges of said first layer of conductive material being antiparallel to said first and second edges of said second layer of conductive material, said filter further comprising source means for applying a third voltage to said first edge of said first layer of conductive material and a fourth voltage to said second edge of said first layer of conductive material.

14. The filter of claim 1, further comprising a third layer of conductive material disposed in said cavity adjacent said first substrate and laterally separated from said first layer of conductive material; a fourth layer of conductive material disposed in said cavity adjacent said second substrate, laterally separated from said second layer of conductive material and disposed across said cavity from said third layer of conductive material, said fourth layer of conductive material being substantially transparent to light at said predetermined wavelength; said tuning medium being disposed between both said first and second layers of conductive material and said third and fourth layers of conductive material; said compensation means including means for enabling a non-uniform voltage profile to be applied across said tuning medium between said third layer of conductive material and said fourth layer of conductive material; means for splitting a beam of light into two distinct beams having substantially orthogonal respective polarizations, directing one said distinct beam into said cavity through said second substrate and said second layer of conductive material, and directing the other said distinct beam into said cavity through said second substrate and said fourth layer of conductive material; and means for recombining said two distinct beams after they have passed through said cavity.

15. The etalon filter of claim 1, further comprising a polarization controller, said polarization controller and said substrates being disposed in a common optical path so as to control the polarization of light presented to said substrates.

16. The etalon filter of claim 15, further comprising a polarization sensitive light tap disposed optically between said substrates and said polarization controller for providing a feedback signal to said polarization controller to present light of a predetermined polarization to said substrates.

17. A method for compensating for variations in the optical flatness of an etalon filter having a first, generally flat substrate; a second, generally flat substrate substantially parallel to said first substrate so as to form a cavity therebetween, said second substrate being substantially transparent to light at a predetermined wavelength; a first layer of conductive material disposed in said cavity adjacent said first substrate; a second layer of conductive material disposed in said cavity adjacent said second substrate, said second layer of conductive material being substantially transparent to light at said predetermined wavelength; a first layer of reflective material disposed in said cavity adjacent said first substrate; a second layer of reflective material disposed in said cavity adjacent said second substrate, said second layer of reflective material being partially reflective at said predetermined wavelength; a tuning medium disposed in said cavity, said tuning medium being substantially transparent to light at said predetermined wavelength, the index of refraction of said tuning medium being a function of the voltage applied across said tuning medium, said method comprising the steps of:

applying to a first edge of said second layer of conductive material a first voltage; and applying to a second edge of said second layer of conductive material a second voltage different from said first voltage, said second edge being separated from said first edge.

* * * * *

UNITED STATES PATENT AND TRADEMARK OFFICE
CERTIFICATE OF CORRECTION

PATENT NO. : 5,710,655 Page 1 of 1
APPLICATION NO. : 08/571283
DATED : January 20, 1998
INVENTOR(S) : Scott H. Rumbaugh It is certified that error appears in the above-identified patent and that said Letters Patent is hereby corrected as shown below:

Column 7, line 43    delete "-$W/2 \leqq x \leqq W/2$." and insert -- -$w/2 \leq x \leq W/2$.--

Signed and Sealed this

Fourth Day of September, 2007

JON W. DUDAS
*Director of the United States Patent and Trademark Office*